(12) United States Patent
McKenney

(10) Patent No.: US 10,983,840 B2
(45) Date of Patent: Apr. 20, 2021

(54) CONSOLIDATING READ-COPY UPDATE TYPES HAVING DIFFERENT DEFINITIONS OF A QUIESCENT STATE

(71) Applicant: International Business Machines Corporation, Armonk, NY (US)

(72) Inventor: Paul E. McKenney, Beaverton, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 131 days.

(21) Appl. No.: 16/014,953

(22) Filed: Jun. 21, 2018

(65) Prior Publication Data

US 2019/0391857 A1 Dec. 26, 2019

(51) Int. Cl.
*G06F 9/52* (2006.01)
*G06F 16/23* (2019.01)
*G06F 1/3228* (2019.01)

(52) U.S. Cl.
CPC ............ *G06F 9/528* (2013.01); *G06F 9/52* (2013.01); *G06F 9/526* (2013.01); *G06F 16/2315* (2019.01); *G06F 16/2365* (2019.01); *G06F 1/3228* (2013.01); *G06F 9/522* (2013.01); *G06F 9/524* (2013.01); *G06F 16/2343* (2019.01)

(58) Field of Classification Search
None
See application file for complete search history.

(56) References Cited

U.S. PATENT DOCUMENTS

| | | |
|---|---|---|
| 5,442,758 A | 8/1995 | Slingwine et al. |
| 5,608,893 A | 4/1997 | Slingwine et al. |
| 5,727,209 A | 3/1998 | Slingwine et al. |
| 6,219,690 B1 | 4/2001 | Slingwine et al. |
| 6,662,184 B1 | 12/2003 | Friedberg |
| 6,886,162 B1 | 4/2005 | McKenney |
| 6,996,812 B2 | 2/2006 | McKenney |
| 7,191,272 B2 | 3/2007 | McKenney |
| 7,287,135 B2 | 10/2007 | McKenney et al. |

(Continued)

OTHER PUBLICATIONS

Kokologiannakis etal, Stateless Model Checking of the Linux Kernel's Hierarchical Read-Copy-Update (Tree RCU), 2017, ACM, Proceedings of International SPIN Symposium on Model Checking of Software, 2017 (Year: 2017).*

(Continued)

*Primary Examiner* — Abu Zar Ghaffari
(74) *Attorney, Agent, or Firm* — Noah Sharkan, Esq.; Blanche E. Schiller, Esq.; Heslin Rothenberg Farley & Mesiti P.C.

(57) ABSTRACT

A technique includes monitoring for a quiescent state by checking first quiescent state criteria that are indicative of a CPU having no task running inside an RCU read-side critical section that could be affected by destructive-to-reader actions. If the quiescent state has been reached, a check may be made for the existence of a condition that is indicative of a requirement to satisfy one or more additional quiescent state criteria before reporting the quiescent state on behalf of the CPU. If the condition is detected, reporting of the quiescent state may be deferred until the one or more additional quiescent state criteria are satisfied. The quiescent state may then be reported if it is useful and safe to do so.

20 Claims, 16 Drawing Sheets

(56) References Cited

U.S. PATENT DOCUMENTS

| | | | |
|---|---|---|---|
| 7,353,346 B2 | 4/2008 | McKenney et al. | |
| 7,349,879 B2 | 6/2008 | McKenney et al. | |
| 7,395,263 B2 | 7/2008 | McKenney | |
| 7,395,383 B2 | 7/2008 | McKenney | |
| 7,426,511 B2 | 9/2008 | McKenney | |
| 7,454,581 B2 | 11/2008 | McKenney et al. | |
| 7,472,228 B2 | 12/2008 | McKenney et al. | |
| 7,653,791 B2 | 1/2010 | McKenney | |
| 7,689,789 B2 | 3/2010 | McKenney et al. | |
| 7,734,879 B2 | 6/2010 | McKenney et al. | |
| 7,734,881 B2 | 6/2010 | McKenney et al. | |
| 7,747,805 B2 | 6/2010 | McKenney | |
| 7,814,082 B2 | 10/2010 | McKenney | |
| 7,818,306 B2 | 10/2010 | McKenney et al. | |
| 7,904,436 B2 | 3/2011 | McKenney | |
| 7,953,708 B2 | 5/2011 | McKenney et al. | |
| 7,953,778 B2 | 5/2011 | McKenney et al. | |
| 8,020,160 B2 | 9/2011 | McKenney | |
| 8,055,860 B2 | 11/2011 | McKenney et al. | |
| 8,055,918 B2 | 11/2011 | McKenney et al. | |
| 8,108,696 B2 | 1/2012 | Triplett | |
| 8,126,843 B2 | 2/2012 | McKenney et al. | |
| 8,176,022 B1 | 5/2012 | Garcia | |
| 8,176,489 B2 | 5/2012 | Bauer et al. | |
| 8,185,704 B2 | 5/2012 | McKenney et al. | |
| 8,195,893 B2 | 6/2012 | Triplett | |
| 8,407,503 B2 | 3/2013 | McKenney | |
| 8,495,641 B2 | 7/2013 | McKenney | |
| 8,615,771 B2 | 12/2013 | McKenney | |
| 8,706,706 B2 | 4/2014 | McKenney | |
| 8,874,535 B2 | 10/2014 | McKenney | |
| 8,924,655 B2 | 12/2014 | McKenney | |
| 8,938,631 B2 | 1/2015 | McKenney | |
| 8,972,801 B2 | 3/2015 | McKenney | |
| 9,003,420 B2 | 4/2015 | McKenney | |
| 9,189,413 B2 | 11/2015 | McKenney | |
| 9,250,978 B2 | 2/2016 | McKenney | |
| 9,256,476 B2 | 2/2016 | McKenney | |
| 9,348,765 B2 | 5/2016 | McKenney | |
| 9,396,226 B2 | 6/2016 | McKenney | |
| 9,389,925 B2 | 7/2016 | McKenney | |
| 9,519,307 B2 | 12/2016 | McKenney | |
| 9,552,236 B2 | 1/2017 | McKenney | |
| 9,720,836 B2 | 8/2017 | McKenney | |
| 9,886,329 B2 | 2/2018 | McKenney | |
| 9,965,432 B2 | 5/2018 | McKenney | |
| 10,437,720 B2* | 10/2019 | Cheriton | G06F 11/1438 |
| 2005/0071811 A1* | 3/2005 | Appavoo | G06F 8/656 717/122 |
| 2006/0130061 A1* | 6/2006 | Bauer | G06F 9/526 718/100 |
| 2007/0061372 A1* | 3/2007 | Appavoo | G06F 8/656 |
| 2007/0067770 A1* | 3/2007 | Thomasson | G06F 9/52 718/100 |
| 2008/0082532 A1 | 4/2008 | McKenney | |
| 2010/0023732 A1* | 1/2010 | Triplett | G06F 1/3203 712/220 |
| 2010/0100575 A1 | 4/2010 | Auerbach et al. | |
| 2010/0115235 A1* | 5/2010 | Triplett | G06F 9/52 712/10 |
| 2010/0325457 A1 | 12/2010 | Lachwani et al. | |
| 2011/0055183 A1* | 3/2011 | McKenney | G06F 9/526 707/704 |
| 2013/0061071 A1 | 3/2013 | McKenney | |
| 2014/0089539 A1 | 3/2014 | Hudzia et al. | |
| 2014/0281295 A1* | 9/2014 | McKenney | G06F 12/121 711/159 |
| 2018/0046468 A1 | 2/2018 | McKenney | |
| 2018/0060086 A1 | 3/2018 | McKenney | |
| 2018/0095666 A1 | 4/2018 | McKenney | |
| 2018/0165125 A1 | 6/2018 | McKenney | |
| 2018/0368899 A1* | 12/2018 | Sahin | A61B 17/8802 |

OTHER PUBLICATIONS

P. McKenney et al., "Read-Copy Update: Using Execution History to Solve Concurrency Problems," PDCS, Oct. 1998, 11 pages.

P. McKenney et al., "Read-Copy Update," 2001 Ottawa Linux symposium, Jul. 2001, 22 pages.

H. Lindar et al., "Scalability of the Directory Entry Cache," 2002 Ottawa Linux Symposium, Jun. 26, 2002, pp. 289-300.

P. McKenney et al.,"Read-Copy Update," 2002 Ottawa Linux Symposium, Jul. 8, 2002, 32 pages.

A. Arcangeli et al., "Using Read-Copy-Update Techniques for System V IPC in the Linux 2.5 Kernel," 2003 Freenix, Jun. 14, 2003, 13 pages.

P. McKenney et al, "Using RCU in the Linux 2.5 Kernel," Linux Journal, Oct. 1, 2003, 11 pages.

P. McKenney et al., "Scaling dcache with RCU," Linux Journal, Jan. 1, 2004, 12 pages.

P. McKenney, "RCU vs. Locking Performance on Different CPUs," 2004 Linux.conf.au, 2004, 18 pages.

P. Zijlstra, "[PATCH] slab: document SLAB_DESTROY_BY_RCU", LKML.org, Nov. 13, 2008, 1 page.

D. Sarma et al., "Making RCU Safe for Deep Sub-Millisecond Response Realtime Applications," 2004 USENIX (UseLinux track) Jun. 2004, 9 pages.

P. McKenney et al, "Extending RCU for Realtime and Embedded Workloads," 2006 Ottawa Linux Symposium, Aug. 11, 2006, 15 pages.

P. McKenney, "Sleepable RCU", LWN.net, Oct. 9, 2006, 10 pages.

T. Gleixner, High Resolution Timers / Dynamic Tics—V2, LWN.net, Oct. 31, 2006, 5 pages.

P. McKenney, "RCU and Unloadable Modules", LWN.net, Jan. 14, 2007, 4 pages.

P. McKenney, "Using Promela and Spin to verify parallel algorithms", LWN.net, Aug. 1, 2007, 11 pages.

P. McKenney, "The design of preemptible read-copy-update," LWN.net, Oct. 8, 2007, 27 pages.

T. Hart et al., "Performance of memory reclamation for lockless synchronization", Journal of Parallel and Distributed Computing, Dec. 2007, pp. 1270-1285.

P. McKenney, "What is RCU, Fundamentally", LWN.net, Dec. 17, 2007, 15 pages.

P. McKenney, What is RCU? Part 2: Usage, LWN.net, Dec. 24, 2007, 15 pages.

P. McKenney, RCU part 3: the RCU API, LWN.net, Jan. 7, 2008, 7 pages.

P. McKenney, "Integrating and Validating dynticks and Preemptible RCU," LWN.net, Apr. 22, 2008, 19 pages.

D. Guniguntala et al., "The read-copy-update mechanism for supporting real-time applications on shared-memory multiprocessor systems with Linux", IBM Systems Journal vol. 47 No. 2, 2008, pp. 221-236.

P. McKenney, "Introducing Technology Into Linux", 2008 Linux Developer Symposium, China, 2008, 47 pages.

P. McKenney, "Hierarchical RCU," LWN.net, Nov. 4, 2011, 19 pages.

P. McKenney, "Using a Malicious User-Level RCU to Torture RCU-Based Algorithms", linux.conf.au, Jan. 2009, 61 pages.

M. Desnoyers, "Low-Impact Operating System Tracing", University of Montreal, PhD Thesis, Dec. 2009, 233 pages.

P. McKenney, "RCU: The Bloatwatch Edition", LWN.net, Mar. 17, 2009, 9 pages.

P. McKenney, "Expedited "big hammer" RCU grace periods", LKML.org, Jun. 25, 2009, 2 pages.

P. McKenney, "RCU cleanups and simplified preemptable RCU", LKML.org, Jul. 23, 2009, 1 page.

P. McKenney, "Deterministic Synchronization in Multicore Systems: the Role of RCU", Aug. 18, 2009, pp. 1-9.

P. McKenney, "Simplicity Through Optimization", linux.conf.au, Jan. 2010, 109 pages.

P. McKenney, "The RCU API, 2010 Edition", LWN.net, Dec. 18, 2010, 11 pages.

J. Triplett et al., "Resizable, Scalable, Concurrent Hash Tables via Relativistic Programming", ACM-SIGOPS Operating System Review vol. 44, Issue 3, Jul. 2010, 14 pages.

(56) References Cited

OTHER PUBLICATIONS

M. Desnoyers et al., "User-Level Implementations of Read-Copy Update", IEEE Transactions on Parallel and Distributed Systems, vol. x, No. y, Jul. 2009, pp. 1-14.
P. McKenney, "Making RCU Safe for Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.
P. McKenney, "Getting RCU Further Out of the Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.LITTLE", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.
P.McKenney, "What Happens When 4096 Cores All Do synchronize_rcu_expedited( )?", linux.conf.au, Geelong, Australia, Feb. 3, 2015.
L. Lian et al., "Verification of the Tree-Based Hierarchical Read-Copy Update the Linux Kernel", Cornell University Library, pp. 1-14, Oct. 11, 2016.
P. McKenney, "A Tour Through RCU's Requirements", LWN.net, 2015, 36 pages.

\* cited by examiner

```
                    modified rcu_preempt_deferred_qs_irqrestore() function 1   static void rcu_preempt_deferred_qs_irqrestore(struct task_struct *t,
2                                                  unsigned long flags)
3   {
4     bool empty_exp;
5     bool empty_norm;
6     bool empty_exp_now;
7     struct list_head *np;
8     bool drop_boost_mutex = false;
9     struct rcu_data *rdp;
10    struct rcu_node *rnp;
11    union rcu_special special;
12
13    special = t->rcu_read_unlock_special;
14    if (!special.s) {
15      local_irq_restore(flags);
16      return;
17    }
18    if (special.b.need_qs) {
19      rcu_preempt_qs();
20      t->rcu_read_unlock_special.b.need_qs = false;
21      if (!t->rcu_read_unlock_special.s) {
22        local_irq_restore(flags);
23        return;
24      }
25    }
26
27    if (special.b.exp_need_qs) {
28      t->rcu_read_unlock_special.b.exp_need_qs = false;
29      rdp = this_cpu_ptr(rcu_state_p->rda);
30      rcu_report_exp_rdp(rcu_state_p, rdp, true);
31      if (!t->rcu_read_unlock_special.s) {
32        local_irq_restore(flags);
33        return;
34      }
35    }
36    /* Diagnostic code removed. */
```

*FIG. 8A*

```
                    rcu_preempt_deferred_qs_irqrestore() function 37   if (special.b.blocked) {
38     t->rcu_read_unlock_special.b.blocked = false;
39     rnp = t->rcu_blocked_node;
40     raw_spin_lock_rcu_node(rnp);
41     WARN_ON_ONCE(rnp != t->rcu_blocked_node);
42     WARN_ON_ONCE(!rcu_is_leaf_node(rnp));
43     empty_norm = !rcu_preempt_blocked_readers_cgp(rnp);
44     WARN_ON_ONCE(rnp->completedqs == rnp->gp_seq &&
45                  (!empty_norm || rnp->qsmask));
46     empty_exp = sync_rcu_preempt_exp_done(rnp);
47     smp_mb();
48     np = rcu_next_node_entry(t, rnp);
49     list_del_init(&t->rcu_node_entry);
50     t->rcu_blocked_node = NULL;
51     if (&t->rcu_node_entry == rnp->gp_tasks)
52       rnp->gp_tasks = np;
53     if (&t->rcu_node_entry == rnp->exp_tasks)
54       rnp->exp_tasks = np;
55     if (IS_ENABLED(CONFIG_RCU_BOOST)) {
56       drop_boost_mutex = rt_mutex_owner(&rnp->boost_mtx) == t;
57       if (&t->rcu_node_entry == rnp->boost_tasks)
58         rnp->boost_tasks = np;
59     }
60     empty_exp_now = sync_rcu_preempt_exp_done(rnp);
61     if (!empty_norm && !rcu_preempt_blocked_readers_cgp(rnp)) {
62       rcu_report_unblock_qs_rnp(rcu_state_p, rnp, flags);
63     } else {
64       raw_spin_unlock_irqrestore_rcu_node(rnp, flags);
65     }
66     if (IS_ENABLED(CONFIG_RCU_BOOST) && drop_boost_mutex)
67       rt_mutex_futex_unlock(&rnp->boost_mtx);
68     if (!empty_exp && empty_exp_now)
69       rcu_report_exp_rnp(rcu_state_p, rnp, true);
70   } else {
71     local_irq_restore(flags);
72   }
73 }
```

*FIG. 8B*

```
                                    ,-72
                                    (
 ┌──────────────────────────────────────────────────────────────┐
 │              rcu_preempt_need_deferred_qs() function         │
 │                                                              │
 │ 1 static bool rcu_preempt_need_deferred_qs(struct task_struct *t)
 │ 2 {                                                          │
 │ 3   return READ_ONCE(t->rcu_read_unlock_special.s) &&        │
 │ 4          !t->rcu_read_lock_nesting;                        │
 │ 5 }                                                          │
 └──────────────────────────────────────────────────────────────┘
```

*FIG. 9*

```
                                    ,-74
                                    (
 ┌──────────────────────────────────────────────────────────────┐
 │                rcu_preempt_deferred_qs() function            │
 │                                                              │
 │ 1 static void rcu_preempt_deferred_qs(struct task_struct *t) │
 │ 2 {                                                          │
 │ 3   unsigned long flags;                                     │
 │ 4                                                            │
 │ 5   if (rcu_preempt_need_deferred_qs(t))                     │
 │ 6     return;                                                │
 │ 7   local_irq_save(flags);                                   │
 │ 8   rcu_preempt_deferred_qs_irqrestore(t, flags);            │
 │ 9 }                                                          │
 └──────────────────────────────────────────────────────────────┘
```

*FIG. 10*

```
                    modified __rcu_process_callbacks() function 1  static void
 2  __rcu_process_callbacks(struct rcu_state *rsp)
 3  {
 4    unsigned long flags;
 5    struct rcu_data *rdp = raw_cpu_ptr(rsp→rda);
 6    struct rcu_node *rnp = rdp->mynode;
 7
 8    WARN_ON_ONCE(!rdp->beenonline);
 9    if (!(preempt_count() & PREEMPT_MASK))
10      rcu_preempt_deferred_qs(current);
11    else if (rcu_preempt_need_deferred_qs(t))
12      resched_cpu(rdp->cpu);
13    rcu_check_quiescent_state(rsp, rdp);
14    if (!rcu_gp_in_progress(rsp) &&
15        rcu_segcblist_is_enabled(&rdp->cblist)) {
16      local_irq_save(flags);
17      if (!rcu_segcblist_restempty(&rdp->cblist, RCU_NEXT_READY_TAIL))
18        rcu_accelerate_cbs_unlocked(rsp, rnp, rdp);
19      local_irq_restore(flags);
20    }
21    rcu_check_gp_start_stall(rsp, rnp, rdp);
22    if (rcu_segcblist_ready_cbs(&rdp->cblist))
23      invoke_rcu_callbacks(rsp, rdp);
24    do_nocb_deferred_wakeup(rdp);
25  }
```

*FIG. 11* modified rcu_preempt_note_context_switch() function

```
1  static void rcu_preempt_note_context_switch(bool preempt)
2  {
3    struct task_struct *t = current;
4    struct rcu_data *rdp;
5    struct rcu_node *rnp;
6
7    lockdep_assert_irqs_disabled();
8    WARN_ON_ONCE(!preempt && t->rcu_read_lock_nesting > 0);
9    if (t->rcu_read_lock_nesting > 0 &&
10      !t->rcu_read_unlock_special.b.blocked) {
11     rdp = this_cpu_ptr(rcu_state_p->rda);
12     rnp = rdp->mynode;
13     raw_spin_lock_rcu_node(rnp);
14     t->rcu_read_unlock_special.b.blocked = true;
15     t->rcu_blocked_node = rnp;
16     WARN_ON_ONCE((rdp->grpmask & rcu_rnp_online_cpus(rnp)) == 0);
17     WARN_ON_ONCE(!list_empty(&t->rcu_node_entry));
18     trace_rcu_preempt_task(rdp->rsp->name,
19              t->pid,
20              (rnp->qsmask & rdp->grpmask)
21              ? rnp->gp_seq
22              : rcu_seq_snap(&rnp->gp_seq));
23     rcu_preempt_ctxt_queue(rnp, rdp);
24   } else if (t->rcu_read_lock_nesting < 0 &&
25       t->rcu_read_unlock_special.s) {
26     rcu_read_unlock_special(t);
27     rcu_preempt_deferred_qs(t);
28   } else {
29     rcu_preempt_deferred_qs(t);
30   }
31   rcu_preempt_qs();
32 }
```

*FIG. 12* modified rcu_preempt_check_callbacks() function

```
1  static void rcu_preempt_check_callbacks(void)
2  {
3    struct rcu_state *rsp = &rcu_preempt_state;
4    struct task_struct *t = current;
5
6    if (t->rcu_read_lock_nesting == 0) {
7      rcu_preempt_qs();
8      return;
9    }
10   if (t->rcu_read_lock_nesting > 0 &&
11       __this_cpu_read(rcu_data_p->core_needs_qs) &&
12       __this_cpu_read(rcu_data_p->cpu_no_qs.b.norm) &&
13       !t->rcu_read_unlock_special.b.need_qs &&
14       time_after(jiffies, rsp->gp_start + HZ))
15     t->rcu_read_unlock_special.b.need_qs = true;
16   if (!(preempt_count() & (PREEMPT_MASK | SOFTIRQ_MASK)))
17     rcu_preempt_deferred_qs(t);
18   else if (rcu_preempt_need_deferred_qs(t))
19     resched_cpu(smp_processor_id());
20 }
```

*FIG. 13* modified rcu_read_unlock_special() function — 110

```
1  static void rcu_read_unlock_special(struct task_struct *t)
2  {
3    unsigned long flags;
4    bool preempt_was_disabled = !!(preempt_count() && HARDIRQ_MASK);
5    bool irqs_were_disabled;
6
7    if (in_nmi())
8      return;
9    local_irq_save(flags);
10   irqs_were_disabled = irqs_disabled_flags(flags);
11   if ((preempt_was_disabled || irqs_were_disabled) &&
12       t->rcu_read_unlock_special.b.blocked) {
13     raise_softirq_irqoff(RCU_SOFTIRQ);
14     local_irq_restore(flags);
15     return;
16   }
17   rcu_preempt_deferred_qs_irqrestore(t, flags);
18 }
```

*FIG. 14* modified sync_rcu_exp_handler() function

```
1  static void sync_rcu_exp_handler(void *info)
2  {
3    struct rcu_data *rdp;
4    struct rcu_state *rsp = info;
5    struct task_struct *t = current;
6
7    if (t->rcu_read_lock_nesting > 0 &&
8       !t->rcu_read_unlock_special.b.blocked) {
9      t->rcu_read_unlock_special.b.exp_need_qs = true;
10     return;
11   }
12   rdp = this_cpu_ptr(rsp->rda);
13   if (preempt_count() & (PREEMPT_MASK | SOFTIRQ_MASK)) {
14     resched_cpu(rdp->cpu);
15     return;
16   }
17   rcu_report_exp_rdp(rsp, rdp, true);
18 }
```

*FIG. 15* modified rcu_report_dead() function

```
1  void rcu_report_dead(unsigned int cpu)
2  {
3    struct rcu_state *rsp;
4
5    preempt_disable();
6    rcu_report_exp_rdp(&rcu_sched_state,
7         this_cpu_ptr(rcu_sched_state.rda), true);
8    preempt_enable();
9    rcu_preempt_deferred_qs(current);
10   for_each_rcu_flavor(rsp)
11     rcu_cleanup_dying_idle_cpu(cpu, rsp);
12 }
```

*FIG. 16* modified rcu_eqs_enter() function 140

```
1  static void rcu_eqs_enter(bool user)
2  {
3    struct rcu_state *rsp;
4    struct rcu_data *rdp;
5    struct rcu_dynticks *rdtp;
6  
7    rdtp = this_cpu_ptr(&rcu_dynticks);
8    WRITE_ONCE(rdtp->dynticks_nmi_nesting, 0);
9    WARN_ON_ONCE(IS_ENABLED(CONFIG_RCU_EQS_DEBUG) &&
10              rdtp->dynticks_nesting == 0);
11   if (rdtp->dynticks_nesting != 1) {
12     rdtp->dynticks_nesting--;
13     return;
14   }
15  
16   lockdep_assert_irqs_disabled();
17   trace_rcu_dyntick(TPS("Start"), rdtp->dynticks_nesting, 0, rdtp->dynticks);
18   WARN_ON_ONCE(IS_ENABLED(CONFIG_RCU_EQS_DEBUG) && !user &&
19              !is_idle_task(current));
20   for_each_rcu_flavor(rsp) {
21     rdp = this_cpu_ptr(rsp->rda);
22     do_nocb_deferred_wakeup(rdp);
23   }
24   rcu_prepare_for_idle();
25   WRITE_ONCE(rdtp->dynticks_nesting, 0);
26   rcu_dynticks_eqs_enter();
27   rcu_dynticks_task_enter();
28   rcu_preempt_deferred_qs(t);
29  }
```

*FIG. 17* modified rcu_momentary_dyntick_idle() function

```
1   static void rcu_momentary_dyntick_idle(void)
2   {
3     struct rcu_dynticks *rdtp = this_cpu_ptr(&rcu_dynticks);
4     int special;
5   
6     raw_cpu_write(rcu_dynticks.rcu_need_heavy_qs, false);
7     special = atomic_add_return(2 * RCU_DYNTICK_CTRL_CTR, &rdtp->dynticks);
8     WARN_ON_ONCE(!(special & RCU_DYNTICK_CTRL_CTR));
9     rcu_preempt_deferred_qs(current);
10  }
```

*FIG. 18*

CONSOLIDATING READ-COPY UPDATE TYPES HAVING DIFFERENT DEFINITIONS OF A QUIESCENT STATE

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data, thereby allowing destructive-to-reader actions to be performed. The second-phase update operation typically entails freeing a stale data element to reclaim its memory, and such operation may thus be referred to as a reclaimer. In certain RCU implementations, the second-phase update operation may involve a different kind of destructive-to-reader action, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This can be done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state, thereby allowing destructive-to-reader actions to be performed.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

In some RCU implementations, such as current versions of the Linux® kernel, there are different RCU "flavors" that have different notions of what constitutes a quiescent state. One such Linux® RCU flavor is called "RCU-sched." A quiescent state for this RCU flavor includes a context switch, the kernel idle loop, user mode execution, a CPU being offline or in a low power (e.g., dynticks-idle) state, and a preemption point wherein a CPU emerges from a preempt-disable code region. This has the side effect of also waiting for all pre-existing interrupt and NMI handlers. Another Linux® RCU flavor is called "RCU-bh." A quiescent state for this RCU flavor includes any code region with bottom-half (aka softirq) processing enabled. Still another Linux® RCU flavor is called "RCU-preempt." A quiescent state for this RCU flavor includes any code that is not explicitly within an RCU read-side critical section as delimited by the rcu_read_lock( ) and rcu_read_unlock( ) CU read-side primitives. In Linux® kernels built with preemption disabled (CONFIG_PREEMPT=n), the RCU-preempt flavor does not exist. Therefore, in such kernels, calls to the RCU-preempt flavor are redirected to the RCU-sched flavor.

Each of the above described Linux® RCU flavors has a corresponding set of read-side and update-side RCU primitives, such as:

(1) RCU-sched: rcu_read_lock_sched( ), rcu_read_unlock_sched( ), call_rcu_sched( ), synchronize_sched( ), synchronize_sched_expedited( ), rcu_barrier_sched( );

(2) RCU-bh: rcu_read_lock_bh( ), rcu_read_unlock_bh( ), call_rcu_bh( ), synchronize_rcu_bh( ), synchronize_rcu_bh_expedited( ), rcu_barrier_bh( );

(3) RCU-preempt: rcu_read_lock( ), rcu_read_unlock( ), call_rcu_( ), synchronize_rcu( ), synchronize_rcu_expedited( ), rcu_barrier( ).

Although this wealth of RCU implementations and APIs allows a very flexible and targeted approach to a variety of concurrency problems, it can also result in uncertainty and confusion as to exactly which RCU flavor should be used in a given circumstance. There is of course documentation to help with this choice, but some users may prefer fewer choices. Applicant thus proposes to consolidate the RCU-bh, RCU-sched and RCU-preempt flavors into a single RCU implementation.

One challenge in this regard is that the tracking of quiescent states and grace periods for the various Linux® RCU flavors is currently handled using a set of per-flavor data structures, including for each flavor, a global rcu_state structure, a hierarchy of rcu_node structures, and a collection of per-CPU rcu_data structures. It would be advantageous to provide an RCU flavor consolidation solution that uses only a single set of such data structures.

SUMMARY

A method, system and computer program product are provided that implement a technique for consolidating read-copy update (RCU) flavors having different notions of what constitutes a quiescent state that allows destructive-to-reader actions to be performed following an associated RCU grace period. The technique may include monitoring for a quiescent state by checking first quiescent state criteria that are indicative of a CPU having no task running inside an RCU read-side critical section that could be affected by the destructive-to-reader actions performed at the end the RCU grace period associated with the quiescent state. If the quiescent state has been reached, a check may be made for the existence of a quiescent state deferral condition that is indicative of a requirement to satisfy one or more additional quiescent state criteria before reporting the quiescent state on behalf of the CPU. If the quiescent state deferral condition is detected, reporting of the quiescent state may be deferred until the one or more additional quiescent state criteria are satisfied. The quiescent state may then be reported if it is useful and safe to do so.

BRIEF DESCRIPTION OF THE DRAWINGS

The foregoing and other features and advantages will be apparent from the following more particular description of example embodiments, as illustrated in the accompanying Drawings.

FIGS. 8A-8B illustrate first and second portions of example source code representing a function named rcu_preempt_deferred_qs_irqrestore ( ) that may be used to report a quiescent state and perform other actions.

FIG. 9 illustrates example source code representing a function named rcu_preempt_need_deferred_qs ( ) that may be used to check whether it would be both useful and safe to report a quiescent state.

FIG. 10 illustrates example source code representing a common case function named rcu_preempt_deferred_qs ( ) that may be used to report both non-deferred and deferred quiescent states.

FIG. 11 illustrates example source code representing a modified Linux® kernel rcu_process_callbacks ( ) function that may be used to help facilitate RCU flavor consolidation in accordance with the present disclosure.

FIG. 12 illustrates example source code representing a modified Linux® kernel rcu_preempt_note_context_switch ( ) function that may be used to help facilitate RCU flavor consolidation in accordance with the present disclosure.

FIG. 13 illustrates example source code representing a modified Linux® kernel rcu_preempt_check_callbacks ( ) function that may be used to help facilitate RCU flavor consolidation in accordance with the present disclosure.

FIG. 14 illustrates example source code representing a modified Linux® kernel rcu_read_unlock_special ( ) function that may be used to help facilitate RCU flavor consolidation in accordance with the present disclosure.

FIG. 15 illustrates example source code representing a modified Linux® kernel sync_rcu_exp_handler ( ) function that may be used to help facilitate RCU flavor consolidation in accordance with the present disclosure.

FIG. 16 illustrates example source code representing a modified Linux® kernel rcu_report_dead ( ) function that may be used to help facilitate RCU flavor consolidation in accordance with the present disclosure.

FIG. 17 illustrates example source code representing a modified Linux® kernel rcu_eqs_enter ( ) function that may be used to help facilitate RCU flavor consolidation in accordance with the present disclosure.

FIG. 18 illustrates example source code representing a modified Linux® kernel rcu_momentary_dyntick_idle ( ) function that may be used to help facilitate RCU flavor consolidation in accordance with the present disclosure.

DETAILED DESCRIPTION OF EXAMPLE EMBODIMENTS

Figure 1A:
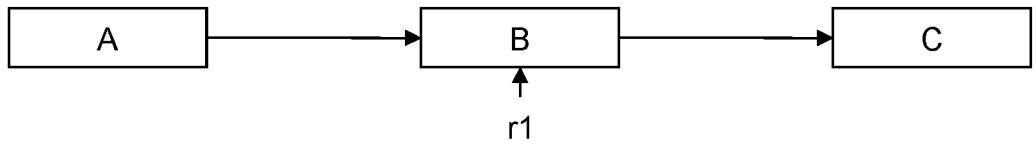
FIGS. 1A-1D are diagrammatic representations of a linked list of data elements undergoing a data element replacement according to a prior art read-copy update mechanism.
Figure 1B:
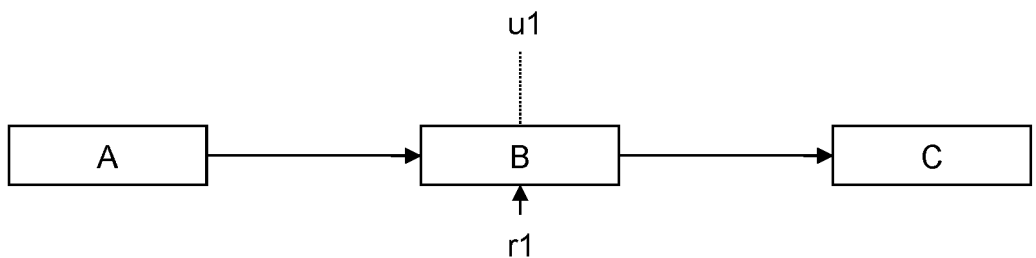
Figure 1C:
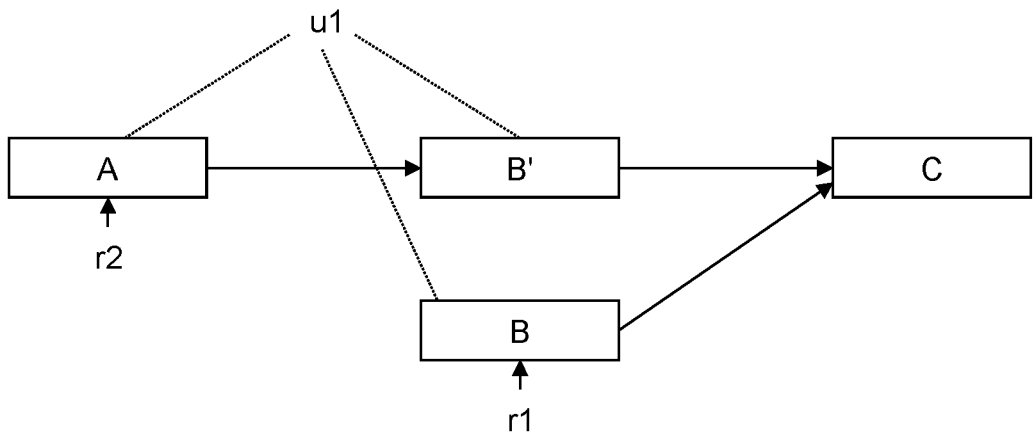
Figure 1D:
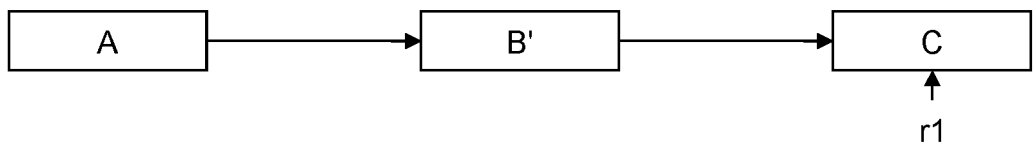
Figure 2A:
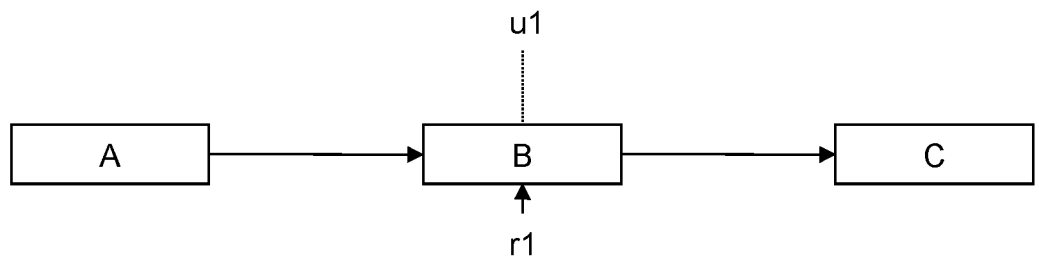
FIGS. 2A-2C are diagrammatic representations of a linked list of data elements undergoing a data element deletion according to a prior art read-copy update mechanism.
Figure 2B:
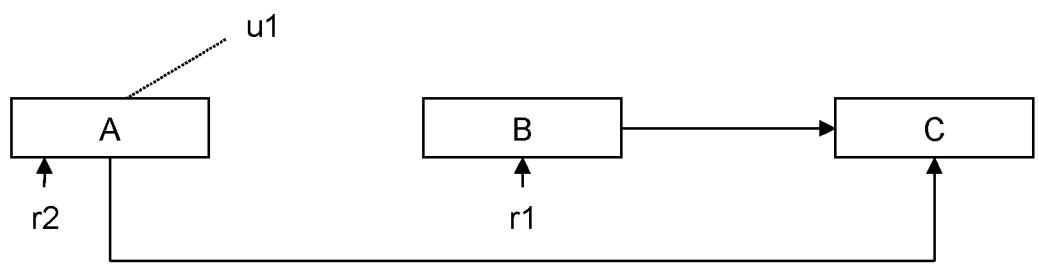
Figure 2C:
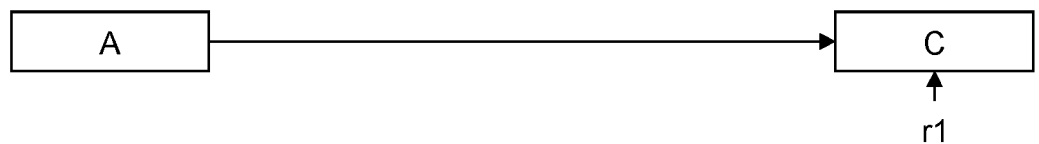
Figure 3:
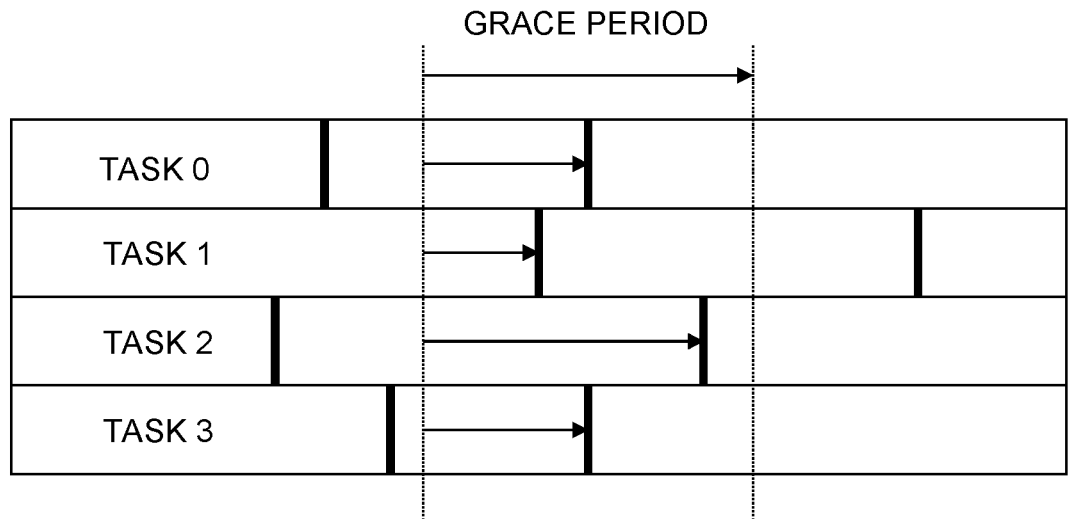
FIG. 3 illustrates an example prior art grace period in which four processes pass through a quiescent state.
Figure 4:
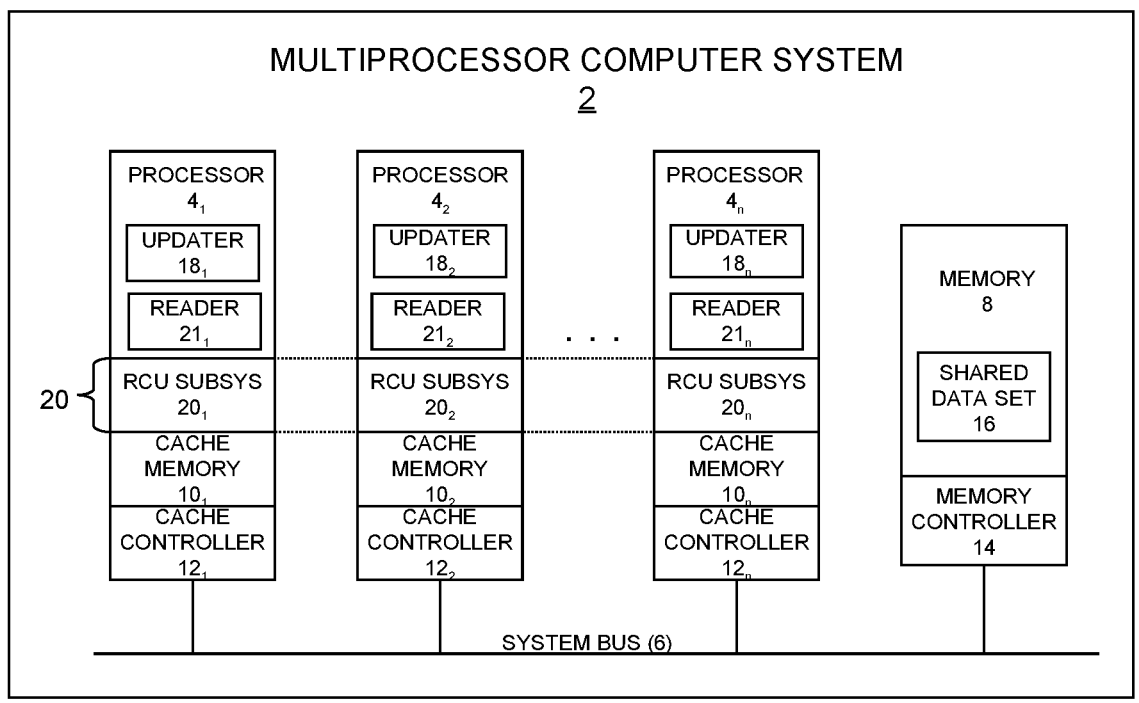
FIG. 4 is a functional block diagram showing an example multiprocessor computing system that implements RCU flavor consolidation in accordance with the present disclosure.

Turning now to the figures, wherein like reference numerals represent like elements in all of the several views, FIG. 4 illustrates an example multiprocessor computer system in which a technique may be implemented for consolidating RCU flavors having different notions of what constitutes a quiescent state. In FIG. 4, a computer system 2 may include a plurality of CPUs (central processing units) 4 (e.g., $4_1$, $4_2 \ldots 4_n$) a system bus 6, and a program memory 8. There may also be cache memories 10 (e.g., $10_1$, $10_2 \ldots 10_n$) and cache controllers 12 (e.g., $12_1$, $12_2 \ldots 12_n$) respectively associated with the CPUs 4. A memory controller 14 may be associated with the memory 8. As illustrated, the memory controller 14 may reside separately from the CPUs 4, for example, as part of a discrete chipset. Alternatively, the memory controller 14 could be provided by plural memory controller instances that are respectively integrated with the CPUs 4.

The computer system 2 may represent any of several different types of computing apparatus. Such computing apparatus may include, but are not limited to, general purpose computers, special purpose computers, portable computing devices, portable computing-communication devices (such as smartphones), media player devices, set-top devices, embedded systems, and many other types of information handling machines. The term "CPU" as used with reference to the CPUs 4 encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). The CPUs 4 may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories 10 may be implemented in several levels (e.g., as level 1, level 2 and level 3 caches) and the cache controllers 12 may collectively represent the cache controller logic that supports each cache level.

Each CPU 4 is operable to execute program instruction logic under the control of a software program stored in the memory 8 (or elsewhere). As part of this program execution logic, update operations (updaters) 18 may execute within a process, thread, or other execution context (hereinafter "task") on any of the CPUs 4. Each updater 18 may run periodically to perform updates on a set of shared data 16 that may be stored in the shared memory 8 (or elsewhere). In FIG. 4, reference numerals $18_1$, $18_2 \ldots 18_n$ illustrate individual data updaters that respectively execute on the several CPUs $4_1$, $4_2 \ldots 4_n$. As described in the "Background" section above, the updates performed by an RCU updater can include modifying elements of a linked list, inserting new elements into the list, deleting elements from the list, and other types of operations. To facilitate such updates, the CPUs 4 may be programmed from instructions stored in the memory 8 (or elsewhere) to implement a read-copy update (RCU) subsystem 20 as part of their data processing functions. In FIG. 4, reference numbers $20_1$, $20_2 \ldots 20_n$ represent individual RCU instances that may respectively periodically execute on the several CPUs $4_1$, $4_2 \ldots 4_n$. Operational details of the RCU subsystem 20 are described below.

Any given CPU 4 may also periodically execute read operations (readers) 21. Each reader 21 may run from program instructions stored in the memory 8 (or elsewhere) in order to periodically perform read operations on the set of shared data 16 stored in the shared memory 8 (or elsewhere). In FIG. 4, reference numerals $21_1$, $21_2 \ldots 21_n$ illustrate individual reader instances that may respectively execute on the several CPUs $4_1$, $4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

In an example embodiment, the readers 21 may be preempted while executing within their RCU read-side critical sections. This would be the case, for example, if the readers 21 embody kernel code paths in a preemptible operating system kernel. To accommodate such reader preemption, the RCU subsystem 20 may be configured as a preemptible RCU implementation.

During operation of the computer system 2, an updater 18 may occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may invoke the RCU subsystem 20 to track an RCU grace period for deferred destruction of the pre-update view of the data (second-phase update).

As discussed in the "Background" section above, an RCU technique is needed that consolidates multiple RCU flavors having different notions of what constitutes a quiescent state, into a single consolidated-flavor RCU implementation. Such RCU flavors may include the RCU-sched, RCU-bh and RCU-preempt flavors found in the Linux® kernel. The consolidated-flavor RCU implementation requires only a single consolidated set of non-flavor-specific RCU data structures. If desired, the consolidated-flavor RCU implementation may consolidate some or all of its API by eliminating certain flavor-specific RCU primitives, particularly on the update side Turning now to FIG. 5, the RCU subsystem 20 may be embodied as a consolidated-flavor RCU implementation that provides the desired functionality. The consolidated-flavor RCU subsystem 20 includes a set of consolidated RCU subsystem support functions 30, and may also a set of consolidated RCU subsystem data structures 50.

Example components of the consolidated RCU subsystem support functions 30 may include a consolidated RCU reader API (Application Programming Interface) 32, a consolidated RCU updater API 34 and a consolidated RCU grace period processing core 36.

The consolidated RCU reader API 32 may include a reader registration component and a reader unregistration component that are respectively invoked by readers 21 as they enter and leave their RCU read-side critical sections to read the data 16. This allows the consolidated-flavor RCU subsystem 20 to track reader operations and determine when readers are engaged in RCU-protected read-side critical section processing. In an example embodiment, the reader registration and unregistration components may be respectively implemented using the rcu_read_lock( ) and rcu_read_unlock( ) primitives found in the existing RCU-preempt flavor. In an embodiment, the RCU-bh and RCU-sched counterparts to these read-side primitives may be eliminated. However, there may be certain benefits to leaving these existing primitives in place, such as for provide improved documentation of intent. For example, the use of rcu_lock_bh( ) and rcu_read_lock(bh) is similar to the use of local_bh_disable( ) and local_bh(enable( ), but the former gives better lockdep-based diagnostics and better documentation of the fact that the intent is both to disable softirq and act as an RCU reader.

The consolidated RCU updater API 34 may include various synchronization primitives for use by updaters 18 to defer removal of the data 16 that may be referenced by the readers 21 until an RCU grace period has elapsed. These synchronization primitives may include normal grace period primitives such as synchronize_rcu( ), and call_rcu( ), as well as expedited grace period primitives such as synchronize_rcu_expedited( ). In an embodiment, the RCU-bh and RCU-sched counterparts to these update-side primitives may be eliminated. Again, however, there may be reasons for leaving these existing primitives in place.

The consolidated RCU grace period core 36 may include a set of functions that cooperate to perform various RCU grace period processing operations. Examples of such functions include starting new RCU grace periods and detecting the end of old RCU grace periods by waiting for CPUs 4 in the computer system 2 to pass through quiescent states. For efficiency reasons, such as reducing real-time latency, these functions may operate within the context of a kernel thread, such as a Linux® kthread. This kthread is sometimes referred to as the "grace period kthread."

Figure 5:
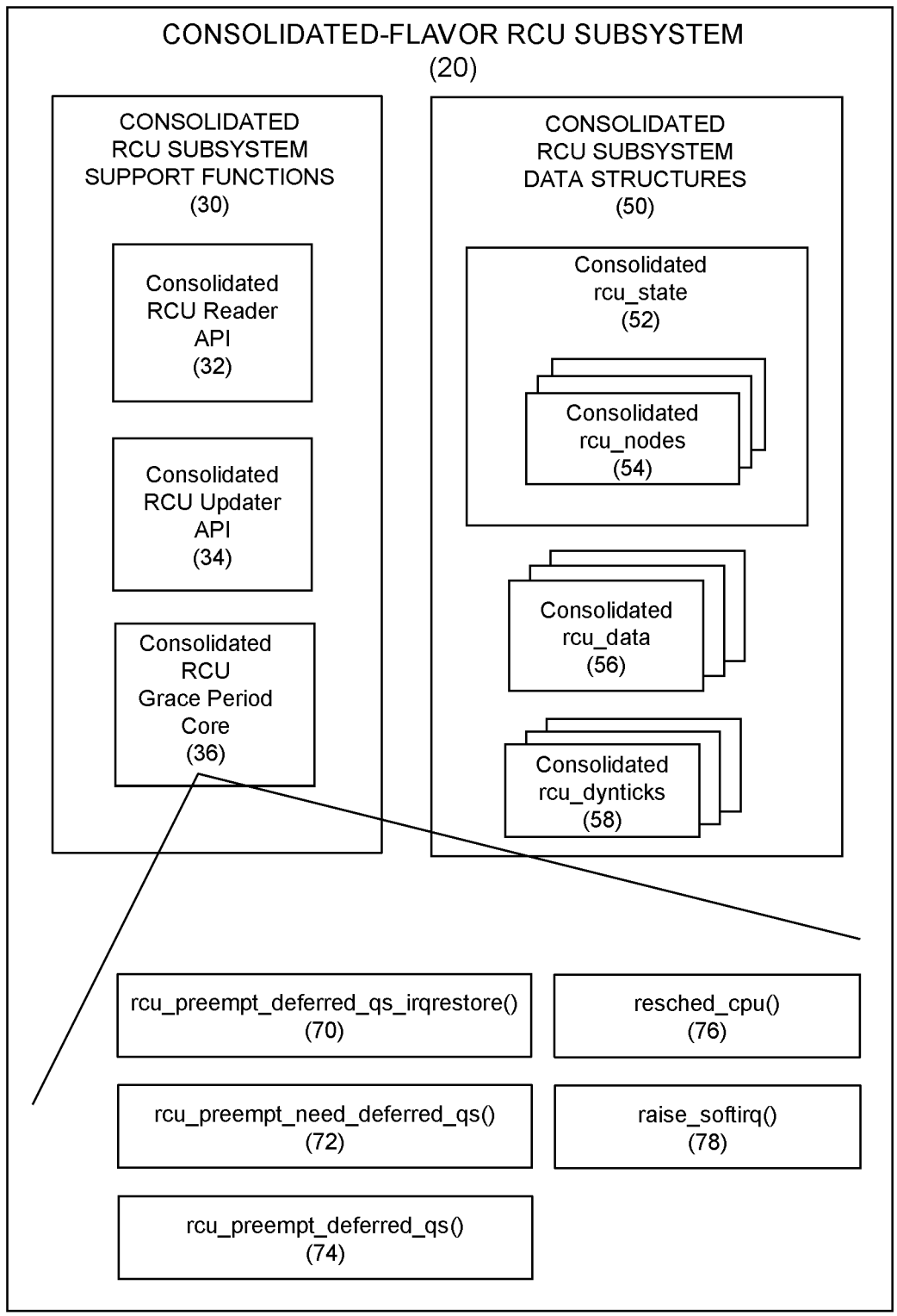
FIG. 5 is a functional block diagram showing an example consolidated RCU subsystem that may be provided in the computer system of FIG. 4.

With continuing reference now to FIG. 5, the consolidated RCU subsystem data structures 50 include a single set of non-flavor-specific RCU data structures. These data structures 50 may include an rcu_state structure 52 having embedded therein (e.g., as a linear array) a consolidated combining tree of rcu_node structures 54. The consolidated-flavor RCU subsystem 20 thus supports hierarchical grace period detection, and may be characterized as a hierarchical RCU implementation. The combining tree of rcu_node structures 54 tracks information needed to determine when RCU grace periods have elapsed. Such tracked information may include, within each rcu_node structure 54, various quiescent state reporting and tracking structures that identify CPUs 4 which have or have not passed through a quiescent state.

Figure 6:
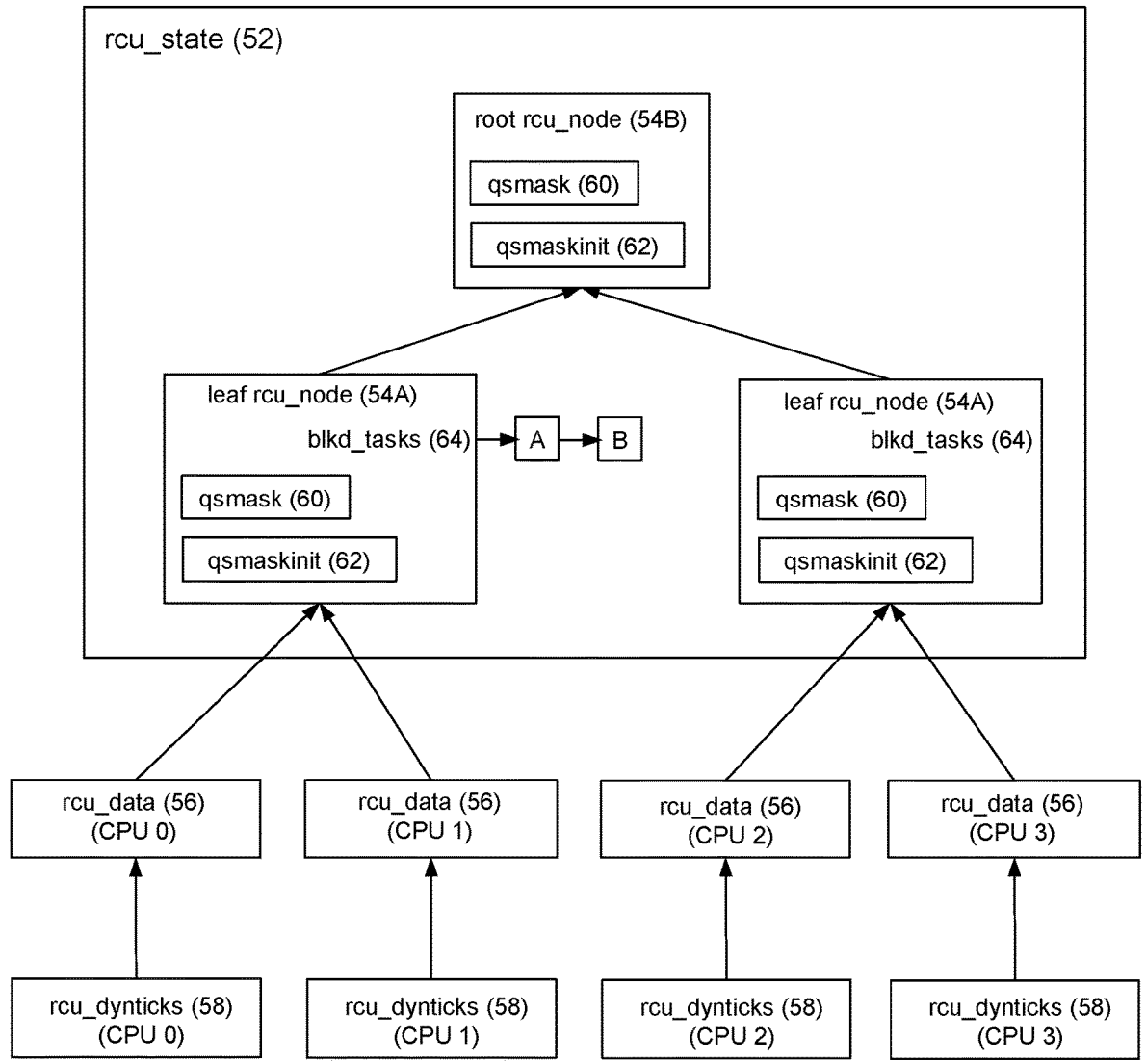
FIG. 6 is a functional block diagram showing example data structures of the consolidated RCU subsystem of FIG. 5.

FIG. 6 illustrates an example of an rcu_state structure 52 embodied as a two-level combining tree of rcu_node structures 54. This rcu_node structure hierarchy includes two bottom-level leaf rcu_node structures 54A and a single top level root rcu_node structure 54B. In a larger system with many CPUs 4, the combining tree could be expanded to include one or more additional levels of rcu_node structures 54.

A set of quiescent state mask (qsmask) bitmasks 60 may be provided at each level of the rcu_node structure hierarchy to indicate which CPU's quiescent states are required in order to end an RCU grace period. In current Linux® RCU implementations, each rcu_node structure 54 maintains two qsmask bitmasks 60 that are respectively used by CPUs 4 to (1) report normal grace period quiescent states, and (2) report expedited grace period quiescent states. The bits of the qsmask bitmasks 60 may be set at the start of each normal and expedited RCU grace period and respectively cleared by the CPUs 4 when they pass through their normal and expedited quiescent states. This represents an efficient mechanism by which the CPUs 4 can record quiescent states for use by the consolidated RCU grace period core 36 (see FIG. 5) to determine when RCU grace periods may end.

A set of quiescent state mask initializer (qsmaskinit) bitmasks 62 may also be provided at each level of the rcu_node structure hierarchy. The qsmaskinit bitmasks 62 indicate which CPUs 4 are online, and whose quiescent states are therefore required to end a grace period. In contrast, offline CPUs 4 are considered to be in an extended quiescent state. In current Linux® RCU implementations, each rcu_node structure 54 maintains four qsmaskinit bitmasks 62. The four qsmaskinit bitmasks 62 respectively track (1) online CPUs for a current normal grace period, (2) online CPUs for a current expedited grace period, (3) online CPUs for a next normal grace period, and (4) online CPUs for a next expedited grace period. When CPU hotplug events occur, the bits of qsmaskinit bitmasks 62 in the leaf rcu_node structures 54A may be set or cleared to respectively indicate CPU status.

The leaf-level rcu_node structures 54A may additionally maintain a blocked task (bt) list 64 for use in preemptible kernels. The blocked tasks lists 64 track RCU reader tasks 21 that were preempted while inside an RCU read-side critical section. In FIG. 6, the left-hand leaf rcu_node structure 54A is shown in an example state wherein its blocked tasks list 64 tracks two blocked RCU reader tasks "A" and "B." The right-hand leaf rcu_node structure 54A is shown in an example state wherein its blocked tasks list 64 is empty. The blocked tasks lists 64 are used to defer the ending of an RCU grace period until the RCU reader tasks thereon have resumed execution and exited their RCU read-side critical sections. In current Linux® RCU implementations configured to support preemptible-kernel operation, the kernel scheduler is responsible for placing an RCU reader task 21 on the blocked tasks list 64 when it is preempted. RCU's read-side critical section exit code is responsible for removing the RCU reader task 21 from the blocked task list 64.

Each leaf rcu_node structure 54 may have a consolidated set of a per-CPU rcu_data structures 56 assigned to it. Each rcu_data structure 56 represents one CPU 4 in the computer system 2 and is used to maintain RCU-related information specific to that CPU, such as RCU callback lists, local quiescent-state and grace-period handling information, and other data. A consolidated set of per-CPU rcu_dynticks structures 58 may also be provided. Each of these data structures maintains a counter that indicates whether or not a given CPU 4 is in an offline or lower-power idle state. CPUs 4 may periodically access their rcu_dynticks structures 58 to record state transitions, such as when a CPU enters or leaves the dynticks-idle state wherein an idle CPU does not receive scheduling clock interrupts.

For purposes of simplified discussion, FIG. 6 depicts two rcu_data structures 56 assigned to each leaf rcu_node structure 54A. Each leaf rcu_node structure 54A thus maintains a set of qsmask bitmasks 60 and a set of qsmaskinit bitmasks 62 wherein each bitmask has two bits apiece, one for each of the two rcu_data structures 56 that report to it. The root rcu_node structure 54B is associated with the two lower level leaf rcu_node structures 54A. The root rcu_node structure's qsmask bitmasks 60 and qsmaskinit bitmasks 62 thus also have two bits apiece, one for each of the two leaf rcu_node structures 54A that report to it.

The bits of each qsmask bitmask 60 are initialized at the start of an RCU grace period using the qsmaskinit bitmasks 62 which indicate currently online CPUs 4. In this way, the qsmask bitmasks 60 will indicate all online CPUs that need to report a quiescent state. CPUs 4 periodically access their assigned leaf rcu_node structure 56 to report RCU quiescent states by clearing their respective bits in the leaf rcu_node structure's qsmask bitmask 60. This includes when a CPU goes offline during the grace period. The grace period kthread performs the same bit-clearing operation to report quiescent states on behalf of idle CPUs.

At some point, all of a leaf rcu_node structure's CPUs 4 will have passed through a quiescent state. Assuming the leaf rcu_node structure 54A is not tracking any blocked RCU reader tasks 21, the last CPU 4 or kthread to clear a bit in the leaf rcu_node structure's qsmask bitmask 60 may propagate this state to the root rcu_node structure 54B. In particular, the CPU 4 or kthread may clear a bit the root rcu_node structure's qsmask bitmask 60 that corresponds to the leaf rcu_node structure 54A. If there are more than two levels in the rcu_node structure combining tree, a bit may be cleared in an qsmask bitmask 60 of an rcu_node structure 54 at the next higher level of the tree. Eventually, all of the root rcu_node structure's qsmask bitmask bits will cleared, at which point the current grace period may end.

Figure 7:
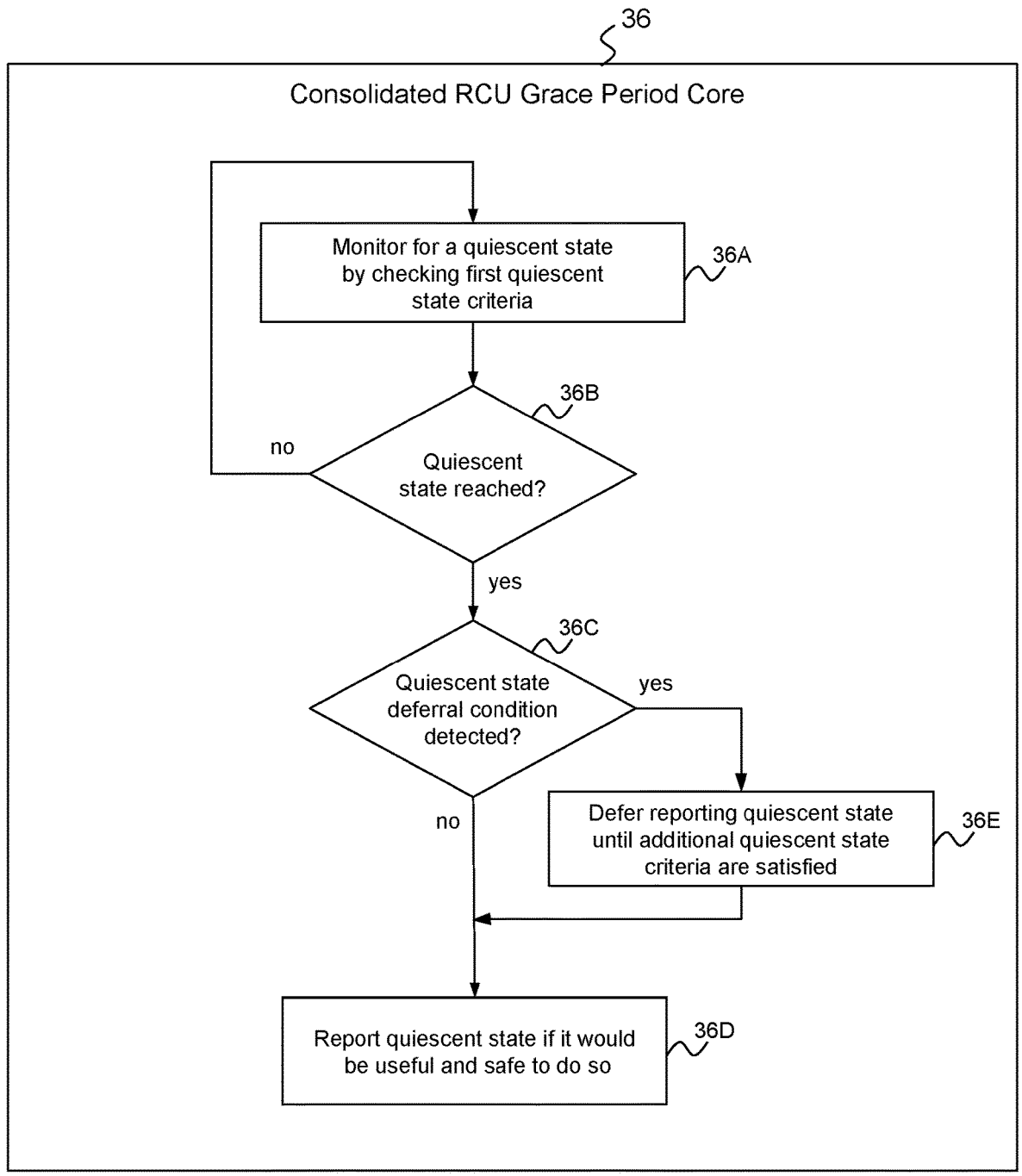
FIG. 7 is a flow diagram illustrating example RCU flavor consolidation that may be performed in accordance with the present disclosure.

Turning now to FIG. 7 the consolidated RCU grace period core 36 of FIG. 5 is shown to implement quiescent state operations that enable the consolidated-flavor RCU subsystem 20 to consolidate multiple RCU flavors having different notions of what constitutes a quiescent state. In block 36A, monitoring for a quiescent state is performed by checking first quiescent state criteria that are indicative of a CPU 4 having no task running inside an RCU read-side critical section that could be affected by destructive-to-reader actions performed at the end an RCU grace period associated with the quiescent state. Block 36B checks whether the quiescent state has been reached, and if not, control returns to block 36A to continue monitoring.

If block 36B determines that the quiescent state has been reached, block 36C checks for the existence of a quiescent state deferral condition that is indicative of a requirement to satisfy one or more additional quiescent state criteria before reporting the quiescent state on behalf of the CPU 4. If block 36C does not detect the quiescent state deferral condition, block 36D reports the quiescent state if it would be useful and safe to do so. As described in more detail below, the safety check may include verifying that the currently-running task is not inside an expressly delimited RCU read-side critical section (e.g., according to the current RCU-preempt flavor). If it is, a quiescent state should not be reported. If block 36C detects the quiescent state deferral condition, block 36E defers reporting the quiescent state until the one or more additional quiescent state criteria are satisfied. If it is useful and safe to report the quiescent state, block 36D will do so after the deferral period.

As discussed above in connection with FIG. 5, an embodiment of the present disclosure may use a consolidated set of data structures (shown by reference number 50), a consolidated set of RCU updater API primitives (shown by reference number 34), and possibly a consolidated set of RCU reader API primitives (shown by reference number 32) to facilitate the tracking of the quiescent states and their associated RCU grace periods regardless of which quiescent state criteria are being checked. Thus, much of the complexity stemming from the existence of different RCU flavors can be eliminated.

In an embodiment, the first quiescent state criteria checked for in block 36A may include one or more of the CPU passing through a context switch, running a kernel idle loop, running in user mode, being offline or in a low power state, and running any code region outside of an expressly delimited RCU read-side critical section.

In an embodiment, the one or more additional quiescent state criteria checked for in block 36C may include the CPU having exited any region of code in which preemption, interrupts or bottom-half processing were disabled when the quiescent state was reached.

In an embodiment, checking for the quiescent state deferral condition as per block 36C may be performed using existing functionality provided by the Linux® kernel. For example, to detect for the existence of disabled bottom-half and preemption code regions, block 36C may use an existing Linux® kernel preemption counter named preempt_count. Each Linux® kernel task maintains an instance of the preempt_count counter to mark whether the task is preemptible. Within this counter, bits 0-7 represent a preemption count, bits 8-15 represent a softirq (bottom-half) count, and bits 16-25 represent a hardirq count. Three bitmasks associated the preempt_count counter allow the count values for the preemptions, softirqs and hardirqs to be readily extracted. These bitmasks are respectively named PREEMPT_MASK, SOFTIRQ_MASK, and HARDIRQ_MASK. As described in more detail below, block 36C uses these masks in various ways to perform existence checks for disabled bottom-half and preemption code regions, when required. Although it would also possible to detect disabled interrupt code regions in an analogous manner, applicant has determined that this is unreliable. Thus, an embodiment of block 36C may instead take the approach of using the Linux® kernel's existing irqs_disabled_flags(flags) function for this purpose.

In an embodiment, block 36E defers quiescent state reporting based on the additional quiescent state criteria using a relaxed approach that does not require determining the exact ends of disabled preemption, interrupt or bottom-half code regions. Although an embodiment of block 36E could be implemented that uses the latter technique, taking this approach would involve adding end-of-region hooks into all code regions where preemption, interrupts and bottom-halves are enabled. This would introduce significant complexity. Moreover, the disabling and enabling of both preemption and interrupts is sometimes open-coded, and sometimes in assembly language, and other times even in hardware. The relaxed approach employed by block 36E avoids these issues.

In an embodiment, block 36E's relaxed approach may include forcing a future context switch on a CPU 4 to ensure that the CPU is not within a disabled preemption, interrupt or bottom-half code region. This relaxed end-of-region check may use an existing Linux® kernel function named resched_cpu( ) to force the future context switch. At the time of the context switch, a modified version of Linux® RCU's rcu_preempt_note_context_switch( ) function reports a deferred quiescent state if it is useful and safe to do so. This modified function is described in more detail below in connection with FIG. 12. Block 36E relies on the fact that the context switch will happen only after any pre-existing disabled bottom-half, preempt or interrupt code regions have ended. Note that this approach borrows from Linux® RCU's existing synchronize_sched_expedited( ) function that invokes an expedited grace period for the existing RCU-sched flavor. The synchronize_sched_expedited( ) function currently uses the resched_cpu( ) function in its IPI interrupt handler, which is named sync_sched_exp_handler( ).

In an embodiment, block 36E's relaxed approach may alternatively include invoking a softirq handler that reports a quiescent state only after interrupts and bottom-halves have been enabled. This relaxed end-of-region check may use an existing Linux® kernel function named raise_softirq (RCU_SOFTIRQ). As is known, the raise_softirq (RCU_SOFTIRQ) function invokes the Linux® kernel's RCU_SOFTIRQ handler, which itself invokes a modified version of Linux® RCU's_rcu_process_callbacks( ) function sometime after interrupts and bottom halves have been re-enabled. This modified function is described in more detail below in connection with FIG. 11. Among other things, the modified _rcu_process_callbacks( ) function reports an RCU quiescent state when it is appropriate to do so.

In an embodiment, block 36E may invoke resched_cpu( ) from interrupt handlers and raise_softirq(RCU_SOFTIRQ) from elsewhere. Other approaches may potentially also be used.

In an embodiment, block 36E may check the additional quiescent state criteria at strategic points of RCU operation where a quiescent state according to the first quiescent state definition would otherwise be reported. In particular, quiescent-state-deferral hooks may be placed into selected RCU functions that are involved in the reporting of quiescent states. These hooks determine whether there is a need for deferred quiescent state reporting by checking for the existence of disabled bottom-half, preemption and interrupt regions. If such a region is found to exist, an appropriate one of the above-described end-of-region checks can be invoked to defer reporting the quiescent state. Otherwise, if no such region is found, a quiescent state may be reported without waiting.

In an embodiment, the RCU functions that may be instrumented with the above-described quiescent-state-deferral hooks are variously found in the Linux® kernel's RCU_SOFTIRQ handler, in Linux® RCU's context-switch code, in Linux® RCU's RCU-preempt code, and in Linux® RCU's expedited grace period code. Linux® RCU's hotplug handlers and kernel idle-entry code may also be modified, but these functions only need to unconditionally invoke the new quiescent state reporting code without performing the above-described condition and end-of-region checks.

In an embodiment, the following Linux® RCU functions may be modified:
(a) RCU_SOFTIRQ handler—_rcu_process_callbacks( );
(b) RCU context-switch code—rcu_preempt_note_context_switch( );
(c) RCU-preempt code—rcu_unlock_special( );
(d) RCU expedited grace period code—rcu_exp_handler( );
(e) RCU hotplug handlers—rcu_report_dead( ); and
(f) RCU kernel-idle entry—rcu_eqs_enter( ), rcu_dynticks_momentary_idle( ).

FIGS. 11-18 illustrate example modified versions of the above RCU functions that have been instrumented with the appropriate hooks that perform deferred quiescent state condition and end-of-region checking. Each of these functions is part of the consolidated RCU grace period core 36 of FIG. 5. In an embodiment, the modified functions of FIGS. 11-18 variously make use of three new functions, now to be described, that assist in reporting quiescent states while providing certain checks.

The three new functions are part of the consolidated RCU grace period core 36 and are respectively shown in FIG. 5 by reference numbers 70, 72 and 74. For purposes of example only, the function 70 may be named rcu_preempt_deferred_qs_irqrestore( ), the function 72 may be named rcu_preempt_need_deferred_qs( ), and the function 74 may be named rcu_preempt_deferred_qs( ).

FIGS. 8A-8B illustrate example C-language source code that may be used to implement the rcu_preempt_deferred_qs_irqrestore( ) function 70. This function consists nearly entirely of code pulled from an existing Linux® RCU function named rcu_read_unlock_special( ), which itself has been modified as described below in connection with FIG. 14. The principal difference between the new rcu_preempt_deferred_qs_irqrestore( ) function 70 and the existing rcu_read_unlock_special( ) function is that the former replaces an early exit check based on being in an NMI handler with an early exit check based on the current task not requiring a quiescent state or special handling, as described below.

The operations performed by the rcu_preempt_deferred_qs_irqrestore( ) function 70 include taking appropriate actions based on the current task needing either a normal quiescent state, an expedited quiescent state, or special handling due to having been preempted during an RCU read-side critical section, placed on a leaf rcu_node structure's blocked task list 64, and having its priority boosted. Details of these operations are shown in FIGS. 8A and 8B.

In FIG. 8A, lines 13-16 represent the early-exit check based on the task not requiring a quiescent state or special handling. Line 13 performs this check by consulting a per-task state structure named rcu_read_lock_special, which is used in existing Linux® RCU implementations. The rcu_read_lock_special state structure maintains three fields named need_qs, exp_need_qs and blocked that respectively indicate a requirement for (1) a normal quiescent state, (2) an expedited quiescent state, or (3) blocked reader handling due to the task having been preempted within an RCU read-side critical section. If line 14 determines that none of these requirements exists, line 15 restores interrupts and line 16 returns.

If line 14 determines that an early-exit is not possible, the remainder of the rcu_preempt_deferred_qs_irqrestore( ) function 70 performs the required additional processing. As noted above, this is the same processing performed by the current read_unlock_special( ) function of existing Linux® RCU implementations.

Lines 18-23 handle reporting a normal quiescent state if one is needed, with lines 22-23 restoring interrupts and returning to the caller if the rcu_read_lock_special state structure indicates that nothing further remains to be done. Otherwise, lines 26-33 handle reporting an expedited quiescent state if one is needed, with lines 32 and 33 restoring interrupts and returning to the caller if the rcu_read_lock_special state structure indicates that nothing further remains to be done.

The FIG. 8B portion of the rcu_preempt_deferred_qs_irqrestore( ) function 70 is devoted to blocked reader handling. This processing includes removing the task from the blkd_tasks list 64 of a leaf rcu_node structure 54A, and performing any required deboosting of the task's priority. Again, the same processing is performed by the current read_unlock_special( ) function of existing Linux® RCU implementations.

FIG. 9 illustrates example C-language source code that may be used to implement the rcu_preempt_need_deferred_qs( ) function 72. This function performs two preliminary checks of a CPU's currently-running task to determine whether it would be useful to report a quiescent state and safe to do so. These are the same checks mentioned above in connection with block 36D of FIG. 7. Lines 3-4 perform both preliminary checks and return status to the caller. Line 3 performs the usefulness check by consulting the previously-described per-task rcu_read_unlock_special state structure to determine if there is a requirement for either (1) a normal quiescent state, (2) an expedited quiescent state, or (3) blocked reader handling due to the task having been preempted within an RCU read-side critical section. Line 4 performs the safety check by consulting an existing Linux® kernel task_struct variable named rcu_read_lock_nesting, which indicates whether the current task is inside an expressly delimited RCU read-side critical section (i.e., of the RCU-preempt variety). If it is, a quiescent state should not be reported.

FIG. 10 illustrates example C-language source code that may be used to implement the rcu_preempt_deferred_qs( ) function 74. This is a common-case function that is invoked when it might be appropriate to report either a deferred or non-deferred quiescent state. Line 5 invokes the rcu_preempt_need_deferred_qs( ) function 72 to determine whether reporting the quiescent state would be both useful and safe. If the answer is affirmative, line 7 disables interrupts and line 8 invokes the rcu_preempt_deferred_qs_irqrestore( ) function 70 to report either a normal or expedited quiescent state, perform any blocked handling that may be required, or take none of these actions if nothing needs to be done. In any event, the rcu_preempt_deferred_qs_irqrestore( ) function 70 will restore the interrupts that were disabled on line 7 of the rcu_preempt_deferred_qs( ) function 74.

As will be seen in the remaining drawing Figures, the illustrated embodiment uses the common-case rcu_preempt_deferred_qs( ) function 74 to check the usefulness and safety of reporting both deferred and non-deferred quiescent states. In an alternative embodiment, the safety check that determines whether the current task is inside an expressly delimited RCU read-side critical section could be restricted to safety-checking only deferred quiescent states in some implementations. Such an implementation would be possible if the first quiescent state criteria checked in block 36A of FIG. 7 already included the same safety check (i.e., for an expressly delimited RCU read-side critical section being in progress). Assuming no quiescent state deferral condition was detected in block 36C, a quiescent state could be reported immediately and without repeating the safety check.

On the other hand, the safety check is quite useful when reporting a deferred quiescent state, even if the same safety check is part of the first quiescent state criteria checked for in block 36A of FIG. 7. In that case, the code path of FIG. 7 will include block 36E, which waits until the additional quiescent state criteria detected in block 36C are satisfied, then invokes block 36D in a deferred manner to report the quiescent state. During the deferral period, a task that was determined in block 36A to be outside of an expressly delimited RCU read-side critical section (thereby satisfying one of the first quiescent state criteria) could have re-entered such a critical section during the deferral period. This would render it unsafe to report a quiescent state even if the additional quiescent state criteria are satisfied.

Roughly speaking, in the illustrated embodiment wherein the additional quiescent state criteria may include disabled preemption, bottom-half and interrupt code regions being underway, the above-described safety check can extend RCU-preempt read-side critical sections in either direction to include overlapping regions of such code. If a disabled preemption, bottom-half or interrupt code region extends from the end of one RCU-preempt read-side critical section to the beginning of another one, the above-described safety check can have the effect of coalescing both critical sections and the intervening region of code into one large critical section. This coalescing can extend to include an arbitrarily large number of RCU-preempt read-side critical sections.

FIG. 11 illustrates example C-language source code representing a modified version 80 of Linux® RCU's _rcu_process_callbacks( ) function. This function is invoked following either (1) the kernel scheduler performing a context switch on a CPU 4, or (2) the scheduler-clock interrupt handler noticing that a CPU took its interrupt from user mode or the kernel idle loop. In either case, a quiescent state will be recorded in a local quiescent-state variable of the CPU's rcu_data structure 56. The next time an RCU_SOFTIRQ handler executes on this CPU 4 (via raise_softirq(RCU_SOFTIRQ)), the _rcu_process_callbacks( ) function 80 will be called. Among other things, the _rcu_process_callbacks( ) function 80 will report the CPU's quiescent state to a corresponding leaf rcu_node structure 54A if it is appropriate to do so.

In FIG. 11, the modifications to the _rcu_process_callbacks( ) function 80 consist of the addition of lines 9-12, which are shown in bold-face italicized text. Line 9 applies the previously-described PREEMPT_MASK to the Linux® kernel's preempt_count counter to determine whether preemption is enabled. If it is, deferred reporting of a quiescent state is not required, and line 10 immediately attempts to report the quiescent state by calling the rcu_preempt_deferred_qs( ) function 74.

Line 11 of the modified _rcu_process_callbacks( ) function 80 is reached if line 9 determines that preemption is disabled. In that case, the reporting of a quiescent state must be deferred until such time as preemption is re-enabled. Line 11 directly invokes the rcu_preempt_need_deferred_qs( ) function 72 to perform the above-described preliminary checks that determine whether the reporting of the quiescent state would be both useful and safe. If true, line 12 invokes the previously-described Linux® kernel resched_cpu( ) function to return control to RCU some time after the preempt-disable region of code has ended. Insofar as this function is utilized by the consolidated RCU grace period core 36 of FIG. 5, it is shown as being a part thereof, and is designated in FIG. 5 by reference number 76.

Note that it is not necessary for the modified _rcu_process_callbacks( ) function 80 to check for disabled interrupts or bottom halves because this function is implemented in a softirq handler. As such, if either interrupts or bottom halves had been disabled, the function could not have been invoked in the first place. Note also the choice of the resched_cpu( ) function 76 instead of raise_softirq(RCU_SOFTIRQ) (also previously described). This choice stems from the fact that the CPU is already in a softirq handler, so that the resched_cpu( ) function 76 hook is a more natural choice to regain control at the end of the preempt-disable region. Moreover, as noted at the outset of the discussion of FIG. 11, it was a prior raise_softirq(RCU_SOFTIRQ) invocation that caused the modified _rcu_process_callbacks( ) function 80 to be invoked in the first place.

As described in more detail below, the raise_softirq (RCU_SOFTIRQ) function is used in other contexts to defer quiescent state reporting. Insofar as this function is utilized by the consolidated RCU grace period core 36 of FIG. 5, it is shown as being a part thereof, and is designated in FIG. 5 by reference number 78.

FIG. 12 illustrates example C-language source code representing a modified version 90 of Linux® RCU's rcu_preempt_note_context_switch( ) function. This function is invoked by the kernel scheduler on each context switch, for example, in response to an earlier invocation of the resched_cpu( ) function 76.

In FIG. 12, the modifications to the rcu_preempt_note_context_switch( ) function 90 consist of the addition of lines 27-29, which are shown in bold-face italicized text. Control reaches line 27 if the current task is not in an RCU-preempt read-side critical section and requires special handling. If so, a call is made to the rcu_read_unlock_special( ) function (described in connection with FIG. 14 below), following by a call on line 27 to the rcu_preempt_deferred_qs( ) function 74. The reason is that the scheduler has disabled preemption at this point, which would cause rcu_read_unlock_special( ) function to incorrectly defer the quiescent state (see discussion of FIG. 14). Calling the rcu_preempt_deferred_qs( ) function 74 on line 27 ends this deferral by attempting to report the quiescent state. Control reaches line 29 when an already-preempted RCU-preempt read-side critical section is preempted again and when preemption occurs outside of any RCU-preempt read-side critical section. This is an unconditional quiescent state given that task-queuing on a leaf rcu_node structure's blocked task list 64 happens on line 23, which implements Linux® RCU's blocked reader handler. The quiescent state is unconditional because the current grace period will not end until the task is subsequently removed from the blkd_tasks list 64. The rcu_preempt_deferred_qs( ) function 74 may therefore be invoked on line 28 to attempt reporting the quiescent state.

FIG. 13 illustrates example C-language source code representing a modified version 100 of Linux® RCU's rcu_preempt_check_callbacks( ) function. This function is invoked from the kernel's scheduling-clock interrupt handler.

In FIG. 13, the modifications to the rcu_preempt_check_callbacks( ) function 100 consist of the addition of lines 16-19, which are shown in bold-face italicized text. Line 16 applies the previously-described PREEMPT_MASK and SOFTIRQ_MASK to the Linux® kernel's preempt_count counter to determine whether the interrupt handler interrupted a region of code with either preemption or bottom halves disabled. If not, a quiescent state may be reported immediately, and line 17 attempts to do so using the rcu_preempt_deferred_qs( ) function 74.

If line 16 determines that the interrupt handler did in fact interrupt a region of code running with either preemption or bottom halves disabled, the reporting of a quiescent state must be deferred until such time as preemption or bottom-half processing, as the case may be, is re-enabled. Line 18 directly invokes the rcu_preempt_need_deferred_qs( ) function 72 to perform the above-described preliminary checks that determine whether the reporting of the quiescent state would be both useful and safe. If true, line 19 invokes the resched_cpu( ) function 76 to return control to RCU some time after the end of the region of code having either preemption or bottom halves disabled.

Note that rcu_preempt_check_callbacks( ) function 100 uses the resched_cpu( ) function 76 instead of the raise_softirq(RCU_SOFTIRQ) function 78. This choice is due to the fact that the rcu_preempt_check_callbacks( ) function 100 is in an interrupt handler, which means that RCU's softirq handler _rcu_process_callbacks( ) function 80 would be invoked upon return from the interrupt, before the interrupted code had a chance to exit the region of code with either preemption or bottom halves disabled. In contrast, the resched_cpu( ) function 76 will not return control to RCU until after a context switch is possible, which is after the end of the region of code with either preemption or bottom halves disabled, as required.

FIG. 14 illustrates example C-language source code representing a modified version 110 of Linux® RCU's rcu_read_unlock_special( ) function. This function is invoked when special quiescent state handling is needed, such as when a task was blocked during its RCU read-side critical section. As described in connection with FIGS. 8A-8B, essentially all of the functionality of Linux® RCU's existing rcu_read_unlock_special( ) function has been moved to the new rcu_preempt_deferred_qs_irqrestore( ) function 70.

In FIG. 14, due to the transfer of functionality as noted above, the modifications to the rcu_read_unlock_special( ) function 110 consist of the addition of lines 4-5, 10-13 and 17, which are shown in bold-face italicized text. Line 4 applies the previously-described HARDIRQ_MASK to the Linux® kernel's preempt_count counter to determine whether the caller is in a region of code with either preemption or bottom halves disabled, then normalizes the result as a Boolean value stored in the preempt_was_disabled variable. Line 5 declares another Boolean variable named irqs_were_disabled.

If line 7 determines that the caller is in an NMI handler, line 8 returns immediately. Otherwise, line 9 disables interrupts, which will be subsequently restored by line 14 or 17. Line 10 uses the previously-described irqs_disabled_flags (flags) Linux® kernel function to determine whether the caller was running with interrupts enabled. As previously mentioned, line 4 does the same for preemption and bottom halves. If line 11 determines that either was disabled, and if line 12 determines that the just-ended RCU read-side critical section was preempted, line 13 defers reporting the quiescent state by calling the raise_softirq(RCU_SOFTIRQ) function 78, which will cause the modified _rcu_process_callbacks( ) function 80 to be invoked. Line 14 then re-enables interrupts, and line 15 returns to the caller.

The reason that line 13 uses the raise_softirq(RCU_SOFTIRQ) function 78 instead of the resched_cpu( ) function 76 is that the former function can lower overhead and often defers quiescent state reporting correctly. One example where it fails to defer correctly happens when an interrupt is received before the end of an extended RCU-preempt read-side critical section, in which case the raise_softirq (RCU_SOFTIRQ) function 78 will be invoked upon return from the interrupt even though preemption might still be disabled. The modified softirq handler _rcu_process_callbacks( ) function 80 deals with this possibility. If neither interrupts, preemption, nor bottom halves were disabled, then line 17 invokes the rcu_preempt_deferred_qs_irqrestore( ) function 74 to immediately report the quiescent state.

FIG. 15 illustrates example C-language source code representing a modified version 120 of Linux® RCU's sync_rcu_exp_handler( ) function. This function is the interrupt handler for IPI's (Interprocessor Interrupts) sent to CPUs 4 by RCU's expedited grace period machinery.

In FIG. 15, the modifications to the sync_rcu_exp_handler( ) function 120 consist of the addition of lines 13-16, which are shown in bold-face italicized text. The modified sync_rcu_exp_handler( ) function 120 must avoid immediately reporting an expedited quiescent state when the corresponding IPI interrupted a preemption-disabled or bottom-halves-disabled region of code. New lines 13-16 carry out this task.

Line 13 applies applies the previously-described PREEMPT_MASK and SOFTIRQ_MASK to the Linux® kernel's preempt_count counter to determine whether the interrupt handler interrupted a region of code with either preemption or bottom halves disabled. If not, an expedited quiescent state may be reported immediately, and line 17 attempts to do so using an existing Linux® RCU function named rcu_report_exp_rdp( ). If line 13 determines that a preemption-disabled or bottom-halves-disabled region of code was interrupted, line 14 invokes the resched_cpu( ) function 76 to defer reporting a quiescent state until both preemption and bottom halves have been re-enabled. Line 15 then returns from this interrupt handler.

The use of the resched_cpu( ) function 76 instead of the raise_softirq(RCU_SOFTIRQ) function 78 is due to being in an interrupt handler, such that RCU's softirq handler would be invoked upon return from the interrupt. This would happen before the interrupted code has a chance to re-enable preemption and/or bottom halves. Note that interrupts in the code being interrupted must have been enabled, otherwise the invocation of the IPI handler would have been deferred until after interrupts were re-enabled. As such, the modified sync_rcu_exp_handler( ) function 120 need not check interrupt state. FIG. 16 illustrates example C-language source code representing a modified version 130 of Linux® RCU's rcu_report_dead( ) function. This function reports a quiescent state on behalf of a CPU 4 going offline and which thus has no further need of RCU.

In FIG. 16, the modifications to the rcu_report_dead( ) function 130 consist of the addition of line 9, which is shown in bold-face italicized text. Line 9 unconditionally attempts to report a quiescent state by calling the rcu_preempt_deferred_qs_( ) function 74. This call is unconditional because the modified rcu_report_dead( ) function 130 is invoked when a CPU is going offline, which is an unconditional quiescent state. Moreover, any prior but ongoing RCU-preempt read-side critical sections will have been recorded by queuing the tasks on the corresponding leaf rcu_node structure's blocked tasks list 64.

FIG. 17 illustrates example C-language source code representing a modified version 140 of Linux® RCU's rcu_eqs_enter( ) function. This function is called by a CPU when entering an RCU extended quiescent state, which can be either the kernel idle loop or adaptive-tickless usermode execution (enabled via the NO_HZ_FULL Linux® configuration option).

In FIG. 17, the modifications to the rcu_eqs_enter( ) function 140 consist of the addition of line 28, which is shown in bold-face italicized text. Line 28 unconditionally attempts to report a quiescent state by calling the rcu_preempt_deferred_qs( ) function 74. This call is unconditional because there is no need to check for disabling of interrupts, bottom halves, or preemption. As noted above, the CPU 4 is about to enter to idle or to adaptive-tickless (NO_HZ_FULL) userspace execution, both of which are unconditionally quiescent states. If there are RCU-preempt read-side critical sections still in effect from earlier execution by this CPU 4, there had to have been a context switch, and this context switch would have enqueued the task previously running on the CPU onto the corresponding rcu_node structure's blkd_tasks list 64. This would block the ending of RCU-preempt grace periods as needed.

FIG. 18 illustrates example C-language source code representing a modified version 150 of Linux® RCU's rcu_momentary_dyntick_idle( ) function. This function records a momentary dyntick-idle quiescent state, which is an unconditional quiescent state. As is known, the dyntick-idle state is a type of low-power idle state in which an idle CPU does not receive scheduling clock interrupts.

In FIG. 18, the modifications to the rcu_dynticks_momentary_idle( ) function 150 consist of the addition of line 9, which is shown in bold-face italicized text. Line 9 unconditionally attempts to report a quiescent state by calling the rcu_preempt_deferred_qs( ) function 74. This has the same effect as before, reporting a quiescent state if it is both needed and safe.

Accordingly, a technique has been disclosed for consolidating read-copy (RCU) update flavors having different notions of what constitutes a quiescent state. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 4-18.

With respect to a computer program product, digitally encoded program instructions may be stored on one or more non-transitory computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Example computer readable data storage media for storing such program instructions are shown by reference numerals 8 (memory) and 10 (cache) of the computer system 2 of FIG. 4. The computer system 2 may further include one or more secondary (or tertiary) storage devices (not shown) that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs).

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawing figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A method for consolidating read-copy update (RCU) types having different notions of what constitutes a quiescent state that allows destructive-to-reader actions to be performed following an associated RCU grace period, the method comprising:

monitoring for the quiescent state by checking first quiescent state criteria that are indicative of a CPU having no task running inside an RCU read-side critical section that could be affected by destructive-to-reader actions performed at the end of the RCU grace period associated with the quiescent state;

based on the quiescent state being reached, checking for the existence of a quiescent state deferral condition that is indicative of a requirement to satisfy one or more additional quiescent state criteria checked at one or more strategic points of a read-copy update operation before reporting the quiescent state on behalf of the CPU;

based on the quiescent state deferral condition being detected, deferring reporting of the quiescent state until the one or more additional quiescent state criteria are satisfied; and reporting the quiescent state based on the quiescent state being reached and the quiescent state deferral condition not being detected, or based on the quiescent state being reached and satisfying the one or more additional quiescent state criteria based on the quiescent state deferral condition being detected, and wherein the reporting the quiescent state includes checking for the CPU running a code region outside of an expressly delimited RCU read-side critical section.

2. The method of claim 1, wherein a consolidated set of data structures is used to facilitate tracking of the quiescent state and the associated RCU grace period regardless of which quiescent state criteria are being checked.

3. The method of claim 1, wherein:
the first quiescent state criteria include one or more of the CPU passing through a context switch, running a kernel idle loop, running in user mode, being offline or in a low power state, and running any code region outside of an expressly delimited RCU read-side critical section; and
the one or more additional quiescent state criteria include the CPU having exited any region of code in which preemption, interrupts or bottom-half processing were disabled when the quiescent state was reached.

4. The method of claim 3, wherein the additional quiescent state criteria are checked using a relaxed approach that does not rely on determining the exact ends of disabled preemption, interrupt or bottom-half processing code regions.

5. The method of claim 4, wherein the relaxed approach includes forcing a future context switch on the CPU to ensure that the CPU is not within a disabled preemption, interrupt or bottom-half code region.

6. The method of claim 4, wherein the relaxed approach includes invoking a softirq handler on the CPU that reports a quiescent state only after interrupts and bottom-halves have been enabled.

7. The method of claim 1, wherein the one or more additional quiescent state criteria are checked at the one or more strategic points of the read-copy update operation at which the quiescent state detected using the first quiescent state criteria would otherwise be reported.

8. A system, comprising:
a plurality of CPUs; and
a memory coupled to the plurality of CPUs, one or more of the plurality of CPUs to perform operations for consolidating read-copy update (RCU) types having different notions of what constitutes a quiescent state that allows destructive-to-reader actions to be performed following an associated RCU grace period, the operations comprising:
monitoring for the quiescent state by checking first quiescent state criteria that are indicative of a CPU having no task running inside an RCU read-side critical section that could be affected by the destructive-to-reader actions performed at the end of the RCU grace period associated with the quiescent state;
based on the quiescent state being reached, checking for the existence of a quiescent state deferral condition that is indicative of a requirement to satisfy one or more additional quiescent state criteria checked at one or more strategic points of a read-copy update operation before reporting the quiescent state on behalf of the CPU;
based on the quiescent state deferral condition being detected, deferring reporting of the quiescent state until the one or more additional quiescent state criteria are satisfied; and
reporting the quiescent state based on the quiescent state being reached and the quiescent state deferral condition not being detected, or based on the quiescent state being reached and satisfying the one or more additional quiescent state criteria based on the quiescent state deferral condition being detected, and wherein the reporting the quiescent state includes checking for the CPU running a code region outside of an expressly delimited RCU read-side critical section.

9. The system of claim 8, wherein a consolidated set of data structures is used to facilitate tracking of the quiescent state and the associated RCU grace period regardless of which quiescent state criteria are being checked.

10. The system of claim 8, wherein:
the first quiescent state criteria include one or more of the CPU passing through a context switch, running a kernel idle loop, running in user mode, being offline or in a low power state, and running any code region outside of an expressly delimited RCU read-side critical section; and
the one or more additional quiescent state criteria include the CPU having exited any region of code in which preemption, interrupts or bottom-half processing were disabled when the quiescent state was reached.

11. The system of claim 10, wherein the additional quiescent state criteria are checked using a relaxed approach that does not rely on determining the exact ends of disabled preemption, interrupt or bottom-half processing code regions.

12. The system of claim 11, wherein the relaxed approach includes forcing a future context switch on the CPU to ensure that the CPU is not within a disabled preemption, interrupt or bottom-half code region.

13. The system of claim 11, wherein the relaxed approach includes invoking a softirq handler on the CPU that reports a quiescent state only after interrupts and bottom-halves have been enabled.

14. The system of claim 8, wherein the one or more additional quiescent state criteria are checked at the one or more strategic points of the read-copy update operation at which the quiescent state detected using the first quiescent state criteria would otherwise be reported.

15. A computer program product, comprising:
one or more non-transitory computer readable data storage media;

program instructions stored on the one or more computer readable data storage media for programming a data processing platform having a plurality of CPUs to perform operations for consolidating read-copy update (RCU) types having different notions of what constitutes a quiescent state that allows destructive-to-reader actions to be performed following an associated RCU grace period, the operations comprising:

monitoring for the quiescent state by checking first quiescent state criteria that are indicative of a CPU having no task running inside an RCU read-side critical section that could be affected by destructive-to-reader actions performed at the end of the RCU grace period associated with the quiescent state;

based on the quiescent state being reached, checking for the existence of a quiescent state deferral condition that is indicative of a requirement to satisfy one or more additional quiescent state criteria checked at strategic points of a read-copy update operation before reporting the quiescent state on behalf of the CPU;

based on the quiescent state deferral condition being detected, deferring reporting of the quiescent state until the one or more additional quiescent state criteria are satisfied; and reporting the quiescent state based on the quiescent state being reached and the quiescent state deferral condition not being detected, or based on the quiescent state being reached and satisfying the one or more additional quiescent state criteria based on the quiescent state deferral condition being detected, and wherein the reporting the quiescent state includes checking for the CPU running a code region outside of an expressly delimited RCU read-side critical section.

16. The computer program product of claim 15, wherein a consolidated set of data structures is used to facilitate tracking of the quiescent state and the associated RCU grace period regardless of which quiescent state criteria are being checked.

17. The computer program product of claim 15, wherein:
the first quiescent state criteria include one or more of the CPU passing through a context switch, running a kernel idle loop, running in user mode, being offline or in a low power state, and running any code region outside of an expressly delimited RCU read-side critical section; and
the one or more additional quiescent state criteria include the CPU having exited any region of code in which preemption, interrupts or bottom-half processing were disabled when the quiescent state was reached.

18. The computer program product of claim 17, wherein the additional quiescent state criteria are checked using a relaxed approach that does not rely on determining the exact ends of disabled preemption, interrupt or bottom-half processing code regions.

19. The computer program product of claim 18, wherein the relaxed approach includes forcing a future context switch on the CPU to ensure that the CPU is not within a disabled preemption, interrupt or bottom-half code region, or wherein the relaxed approach includes invoking a softirq handler on the CPU that reports a quiescent state only after interrupts and bottom-halves have been enabled.

20. The computer program product of claim 15, wherein the one or more additional quiescent state criteria are checked at the one or more strategic points of the read-copy update operation at which the quiescent state detected using the first quiescent state criteria would otherwise be reported.

\* \* \* \* \*